United States Patent [19]
David

[11] Patent Number: 5,163,545
[45] Date of Patent: Nov. 17, 1992

[54] AUXILIARY CONVEYING APPARATUS FOR USE WITH MOBILE ARTICULATED CONVEYORS

[75] Inventor: Joseph S. David, Franklin, Pa.

[73] Assignee: Joy Technologies Inc., Pittsburgh, Pa.

[21] Appl. No.: 818,719

[22] Filed: Jan. 7, 1992

[51] Int. Cl.⁵ .............................................. B65G 15/26
[52] U.S. Cl. ................................... 198/588; 198/594; 198/861.2
[58] Field of Search .............. 198/303, 588, 591, 594, 198/607, 861.1, 861.2; 299/43, 44, 45, 64, 65, 66, 67

[56] References Cited

U.S. PATENT DOCUMENTS

| | | | |
|---|---|---|---|
| Re. 31,622 | 7/1984 | Todd | 299/1.4 |
| 928,183 | 7/1909 | Cunningham | 198/594 |
| 1,145,438 | 7/1915 | Potter | 104/126 |
| 1,462,078 | 7/1923 | Williams et al. | 198/587 |
| 1,822,930 | 9/1931 | Keller | 72/227 |
| 1,920,500 | 8/1933 | Garcia et al. | 198/594 X |
| 2,063,431 | 12/1936 | Grayson et al. | 62/321 |
| 2,169,424 | 8/1939 | Levin | 299/64 |
| 2,715,502 | 8/1955 | McCarthy | 198/594 X |
| 2,733,806 | 2/1956 | Laniel, Jr. | 198/303 |
| 2,759,585 | 8/1956 | Timmons et al. | 193/36 |
| 2,851,150 | 9/1958 | Boersma | 198/303 |
| 3,288,272 | 11/1966 | Murphy | 198/617 |
| 3,469,887 | 9/1969 | Nakahara et al. | 104/23.2 |
| 3,902,588 | 9/1975 | Sato | 198/787 |
| 4,031,997 | 6/1977 | Nelson | 198/301 |
| 4,339,031 | 7/1982 | Densmore | 198/864 |
| 4,798,279 | 1/1989 | Doess et al. | 198/594 |
| 4,852,724 | 8/1989 | Bodimer | 198/861.2 |
| 4,896,764 | 1/1990 | Neunzert | 198/861.2 X |

Primary Examiner—Donald T. Hajec
Assistant Examiner—James R. Bidwell
Attorney, Agent, or Firm—Kirkpatrick & Lockhart

[57] ABSTRACT

An auxilliary conveying apparatus for receiving and conveying mined ore from the discharge bridge or a mobile articulated conveyor. The apparatus includes an endless belt conveyor that is disposed at an angle between first and second stationary conveyors that intersect at right angles to one another. A first portion of the endless belt conveyor extends under a portion of the first, upstream stationary conveyor while a second portion of the endless belt conveyor extends over a portion of the second, downstream stationary conveyor. Guide rails are provided to guide the discharge bridge in a predetermined curvilinear path over the endless belt conveyor to enable the discharge bridge to deposit material thereupon. Other guide rails or tracks are supplied to guide the mobile articulated conveyor discharge in a predetermined path that is adjacent to the first and second conveyors and endless belt conveyor that is suited to its inherent turning radius. Transition rails are provided for connecting the guide rails located on the first and second stationary conveyors to the guide rails located on the endless belt conveyor.

12 Claims, 6 Drawing Sheets

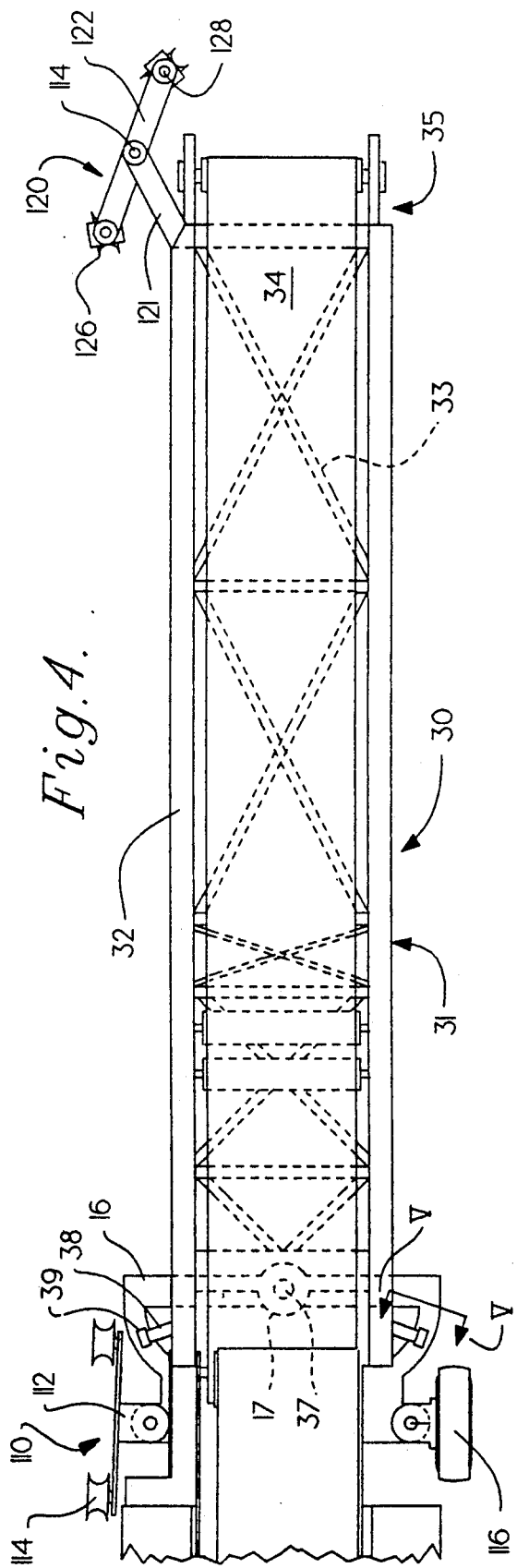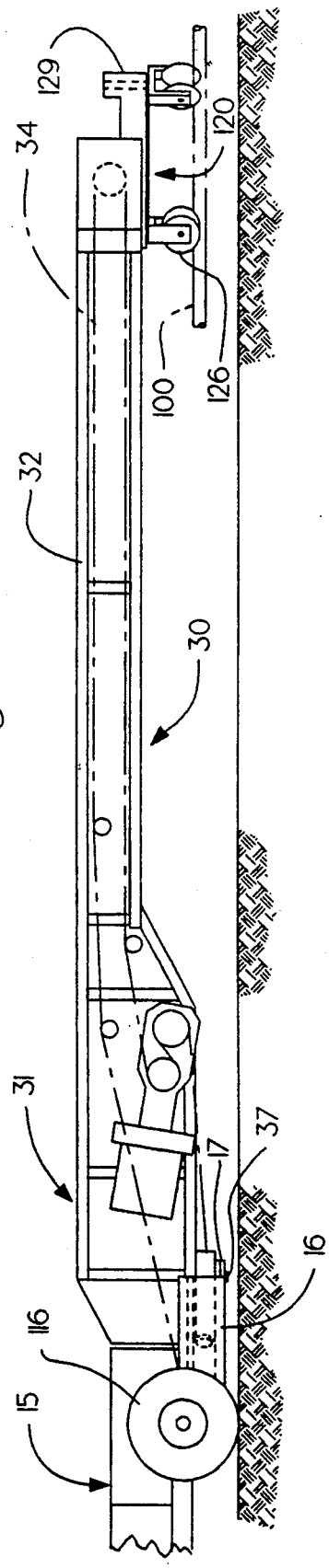

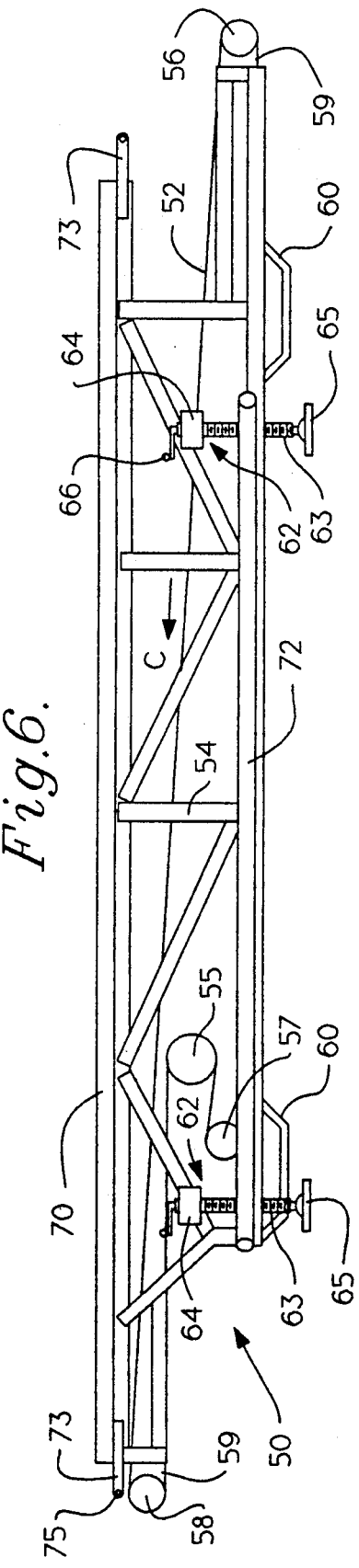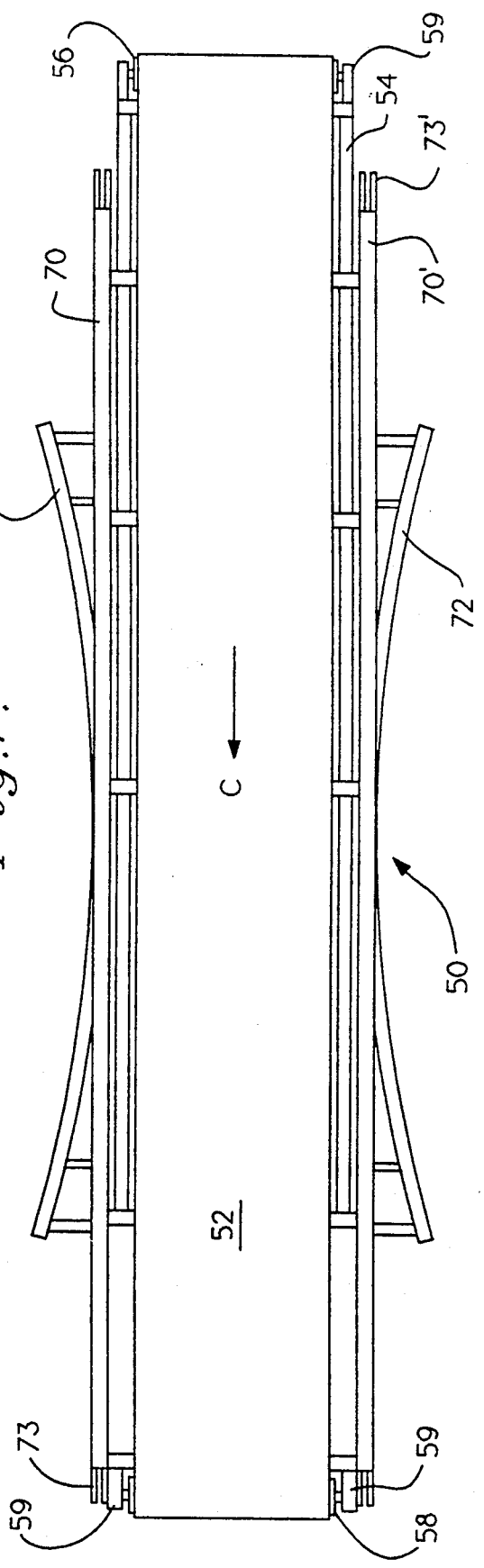

Fig.12.
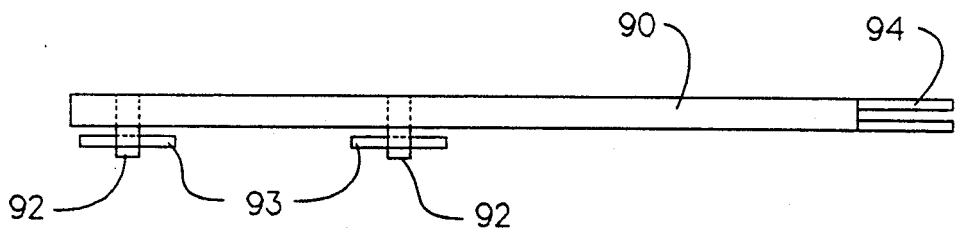
Fig.13.
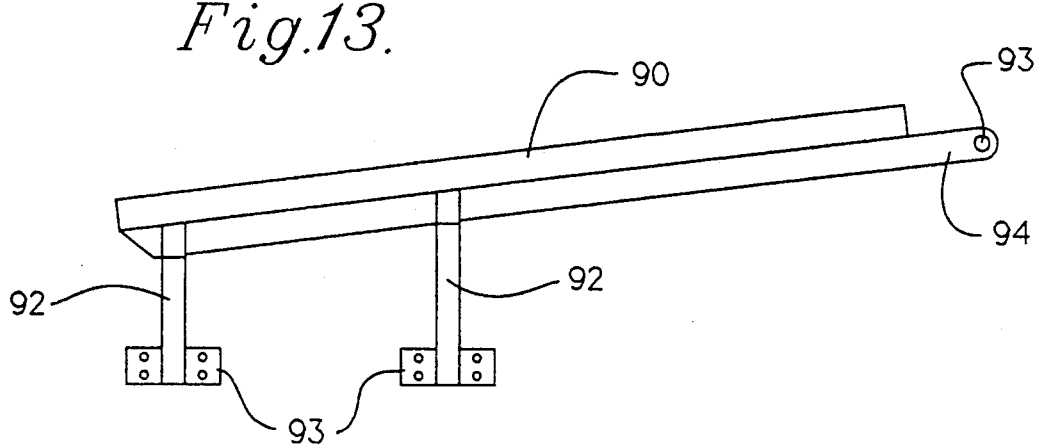
Fig.14.
Fig.11.
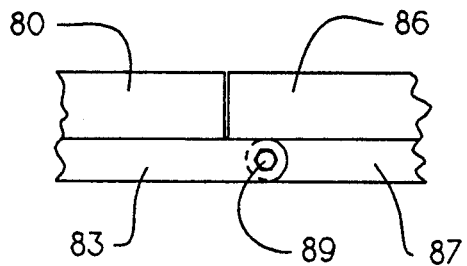
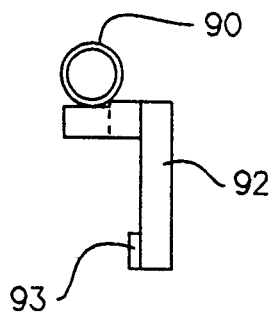

AUXILIARY CONVEYING APPARATUS FOR USE WITH MOBILE ARTICULATED CONVEYORS

BACKGROUND OF THE INVENTION

1. Field of the Invention

The present invention relates to conveying apparatus and, more particularly, is directed to conveying apparatus used in connection with mobile articulated conveyors and their attendant stationary conveyors for conveying mined material within a mine.

2. Description of the Invention Background

In the materials mining industry, especially in the underground mining of coal or the like, belt conveyors are used to transport the mined ore out of the mine. In particular, during the early stages of mine development, main haulageways are initially developed within the mine to accommodate stationary main belt conveyors that are used to transfer the mined ore from the mine. As the mine development progresses, roadways are branched off from these main haulageways to lesser roadways and finally to rooms which are generated specifically to retrieve the remaining coal or ore. Although the mine layout and development is somewhat dictated by the configuration of the particular seam, the roadways are typically developed perpendicular to the main haulageway.

As the network of lesser roadways is developed, separate stationary conveyors, known as panel conveyors, are installed therein to convey the mined ore to the main conveyor located in the main haulageway. Typically, those panel conveyors consist of short sections of conveyors that can be connected together to expand the conveyor network as needed.

In a preferred practice, a mobile conveyor may be used to convey the mined ore directly from the mining machine to the panel conveyors or to the main conveyor itself. Mobile articulated conveyors of the types disclosed in U.S. Pat. Nos. 4,031,997 and 4,852,724, can move under self-propulsion along mine roadways and around corners while receiving the mined ore directly from the mining machine and discharging it onto the main conveyor or one of the attending panel conveyors. Mobile articulated conveyors generally employ two different methods of discharging the mined ore onto an attending stationary conveyor. More specifically, the mobile articulated conveyor may be adapted to tram onto a track mounted directly above the stationary conveyor or, in the alternative, may be adapted to run beside the stationary conveyor by employing a "bridge" conveyor to transfer the ore from the discharge end of the mobile articulated conveyor to the attending section of stationary conveyor. The choice between such methods depends primarily on the mine height, mining width available, and preference of the mining engineer.

The present invention relates to the latter method of discharge. In particular, a problem that exists with the latter discharge method is that of effecting a transition from discharging particulate matter from the bridge conveyor onto the panel conveyor from a previous discharge position onto the stationary main conveyor. Specifically, because the discharge end of the bridge conveyor rides upon guide means attached to the stationary conveyor and because the discharge end of the mobile articulated conveyor is also partially supported and guided by the stationary conveyor, a certain length of the discharge end of the articulated conveyor is constrained to remain parallel with the stationary conveyor. Therefore, the length that can be mined away from the stationary conveyor will always be shorter than the combined length of mobile articulated conveyor and the miner. As such, the aforementioned length of the articulated conveyor cannot be disconnected from the stationary conveyor because the length of the mobile articulated conveyor cannot be accommodated within the length of tunnel that can be mined while being so constrained.

Further, because the mobile conveyor's discharge follows a path which is not at a 90 degree angle, but rather "cuts the corner" on a fixed radius between the main and panel conveyor belts, at the juncture between the belts, there is no means provided for receiving the bridge conveyor's discharge which does not follow a 90 degree path in the horizontal plane. Accordingly, one practice which is employed is to allow the miner to proceed in advance of the flexible conveyor and, instead, use shuttle cars to convey mined materials from an advance area sufficient to allow the length of the articulated conveyor to be accommodated. However, in that method an additional piece of expensive machinery is needed.

Thus, the need exists for an auxiliary conveying system that can be utilized in conjunction with stationary conveyors to enable a mining machine with its attendant mobile articulated conveyor to allow continuous mine development without the need for additional mining machinery.

SUMMARY OF THE INVENTION

The preferred embodiment of the present invention, as disclosed herein, includes various unique features for facilitating the transportation of material from a mining machine and its attendant self-propelled mobile articulated conveyor to corresponding stationary conveyors located remote from the mining machine. While these unique features are particularly adapted for conveying materials within an underground mining operation, it will be understood that some of the features may be incorporated, either singularly or together, into aboveground conveying systems that employ a network of intersecting stationary conveyors.

It is accordingly, the principal object of the present invention to provide an auxiliary conveyor and corresponding guide rail system that can be used with an articulated conveyor and its attendant network of stationary conveyors so as to eliminate the need for a separate mining machine when developing new roadways to advance the network of stationary conveyors.

Addressing these and other objectives, there is provided an auxiliary coal conveying apparatus adapted to receive and convey mined material from a continuous mining machine and its attendant mobile articulated conveyor system. A typical mobile articulated conveyor system employs a bridge conveyor to transfer the mined ore from the mobile conveyor train to a first stationary conveyor. The bridge conveyor is normally pivotally attached to the end of the mobile articulated conveyor and arranged to pivot in a horizontal plane around the end of the articulated conveyor train. As mentioned above, the first stationary conveyor is normally adapted to discharge into a second stationary conveyor disposed perpendicularly thereto. Each of the first and second conveyors are typically equipped with a discrete set of guide rails that are adapted to guide the bridge conveyor and the discharge end of the articulated conveyor therealong.

The conveying apparatus of the present invention includes an auxiliary belt conveyor that is disposed between the two stationary conveyors and is adapted to receive the mined material from the bridge conveyor and discharge it onto the downstream stationary conveyor. The auxiliary conveyor consists of a portable framework having a driven endless belt rotatably supported thereon. First and second guide rails, substantially corresponding with the guide rails located on each of the stationary conveyors, are affixed to the frame of the auxiliary conveyor. Appropriate interconnecting transition guides are provided to connect the first and second guide rails on the auxiliary conveyor to the corresponding guide rails located on the two intersecting stationary conveyors to create endless guide rails adapted to guide the bridge conveyor discharge in a path over the two intersecting conveyors and the auxiliary conveyor on one such guide rail and to guide the discharge of the articulated conveyor in an arcuate path suited to its normal turn radius on the other rail. Wheeled dollies are pivotally attached to the bridge conveyor and the discharge end of the mobile articulated conveyor to guide the same along the guide rails. Deflection skirting is strategically affixed along the sides of the auxiliary conveyor to help direct the mined material into the auxiliary conveyor as it is being discharged from the bridge conveyor.

As the mine is developed, the mining machine, with its attendant mobile articulated conveyor, mines as far as it can reach in predetermined directions while the mobile articulated conveyor's bridge conveyor remains movably attached to the first stationary conveyor. Thereafter, the mobile articulated conveyor is retracted along that stationary conveyor far enough so that a drive and a short section of a second stationary conveyor can be can be installed in a branching arrangement from the first stationary conveyor. The auxiliary conveyor and guide rail system of the present invention is then installed between the first and second stationary conveyors in the manner described hereinabove. By installing the auxiliary conveyor and its corresponding guide rails, the mining machine and its attendant mobile articulated conveyor are afforded additional flexibility to enable the mining machine to do the development required to use and extend the new branch of stationary conveyors without the assistance of a separate mining machine. The auxiliary belt conveyor and guide rail system of the present invention is used in this manner until the entire mobile articulated conveyor, when retracted, lies along the new section of stationary conveyor. At this point, the auxiliary conveyor and its related guide rails may be removed and stored until they are needed at another point of intersection.

Accordingly, the present invention provides solutions to the aforementioned problems encountered when using mobile articulated conveyors. In particular, the auxiliary conveying system of the present invention enables the mining machine with its attendant mobile articulated conveyor to develop the roadways necessary to expand the system of stationary conveyors without the aide of another mining machine. These and other details, objects, and advantages of the invention will become apparent as the following detailed description of the preferred embodiment thereof proceeds.

BRIEF DESCRIPTION OF THE DRAWINGS

For the present invention to be clearly understood and readily practiced, preferred embodiments will now be described, by way of example only, with reference to the accompanying Figures wherein like reference numerals are employed to designate like elements and wherein:

FIG. 3 is a side elevational view of the bridge conveyor of the present invention;

FIG. 4 is a top view of the bridge conveyor of the present invention;

FIG. 6 is a side elevational view of the auxiliary conveyor of the present invention;

FIG. 7 is a top view of the auxiliary conveyor of the present invention;

FIG. 11 is a side view illustrating a connection joint between the transition guides of FIGS. 9 and 10;

FIG. 12 is a top view of a transition guide of the present invention;

FIG. 13 is a side view of the transition guide of FIG. 12; and

FIG. 14 is a left side view of the transition guide of FIG. 13.

DETAILED DESCRIPTION OF THE PREFERRED EMBODIMENTS

Figure 1:
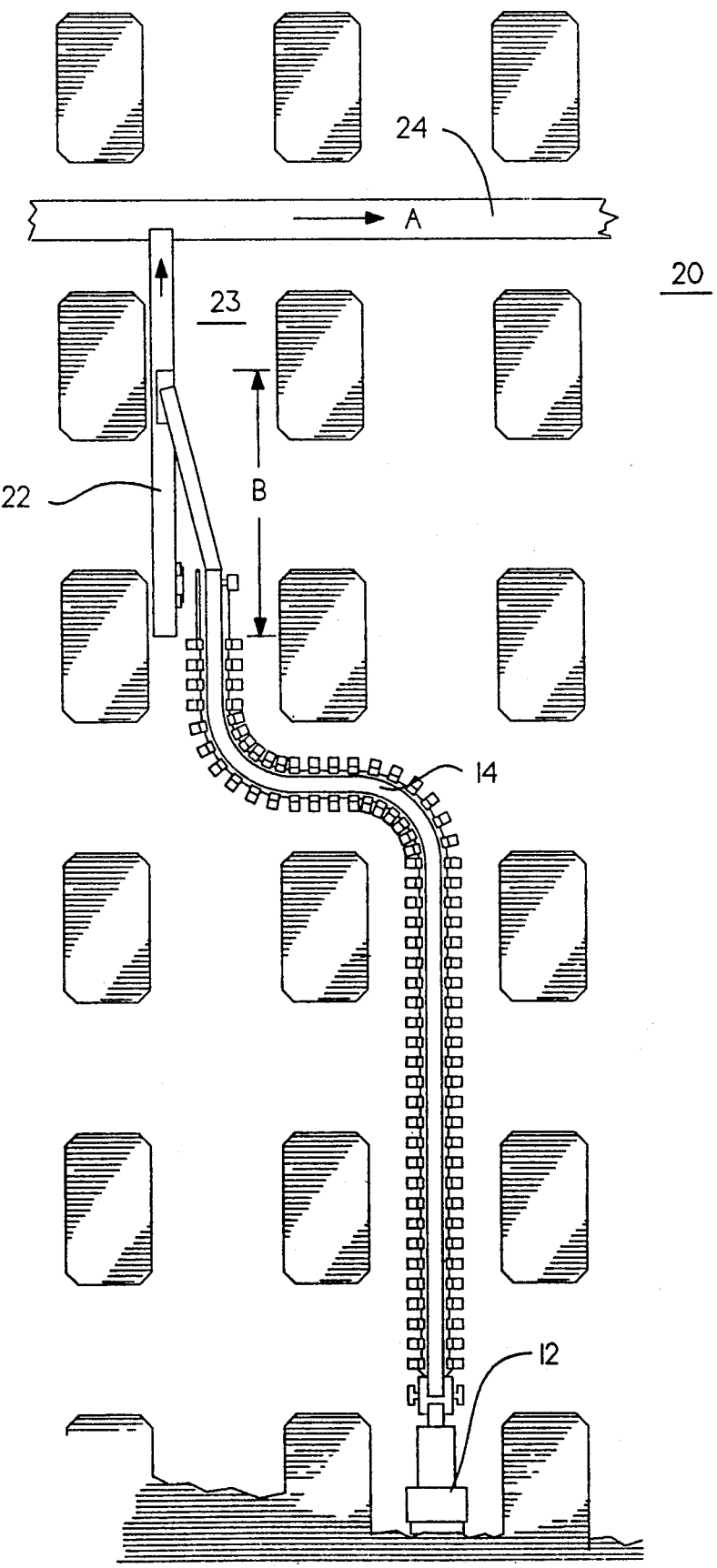
FIG. 1 is a plan view of a mine showing a continuous mining machine and prior mobile articulated conveyor and stationary conveyor arrangement.

Referring now to the drawings for purposes of illustrating the present preferred embodiment of the invention only and not for purposes for limiting the same, the Figures show an auxiliary coal conveying apparatus generally designated as 10.

More particularly and with reference to FIG. 1, there is shown a typical mining operation wherein a mining machine 12 is employed to extract the ore from the mine. A mobile articulated conveyor 14 receives the ore from the mining machine 12 and conveys mined material to a first stationary conveyor 22 located remote from the mining machine 12 in a roadway 23. The conveyor 22, also known as a panel conveyor, is adapted to receive the mined ore from the mobile articulated conveyor 14 and discharge it onto a second stationary conveyor 24, as illustrated by the arrow "A". The conveyor 24, also known as a main conveyor, extends along a main haulageway 20 and serves to transport the mined ore out of the mine. Because the mine development is largely a function of the particular seam configuration, it will be appreciated that roadway 23 may be developed at a variety of angles with respect to the main haulageway 20.

During the development of the mine, the mobile articulated conveyor 14 is initially captively fastened to the main conveyor 24 and is incapable of switching to conveyor 22 when the location of the mining machine 12 so requires. Further, because of the above described arrangement, a portion of the discharge end of the mobile articulated conveyor 14 (designated as "B" in FIG. 1) is forced to follow a straight line that is substantially parallel with the main conveyor 24 or the stationary conveyor 22, as the case may be, to which it is attached. Thus, while attached to the main conveyor 24, the effective reach of the mobile articulated conveyor 14 is limited by a distance equivalent to the distance "B" shown in FIG. 1. As such, separate shuttle cars (not shown) must then be employed to transfer the mined ore from the mining machine 12 to the mobile articulated conveyor 14 so that the mine development may proceed.

Figure 2:
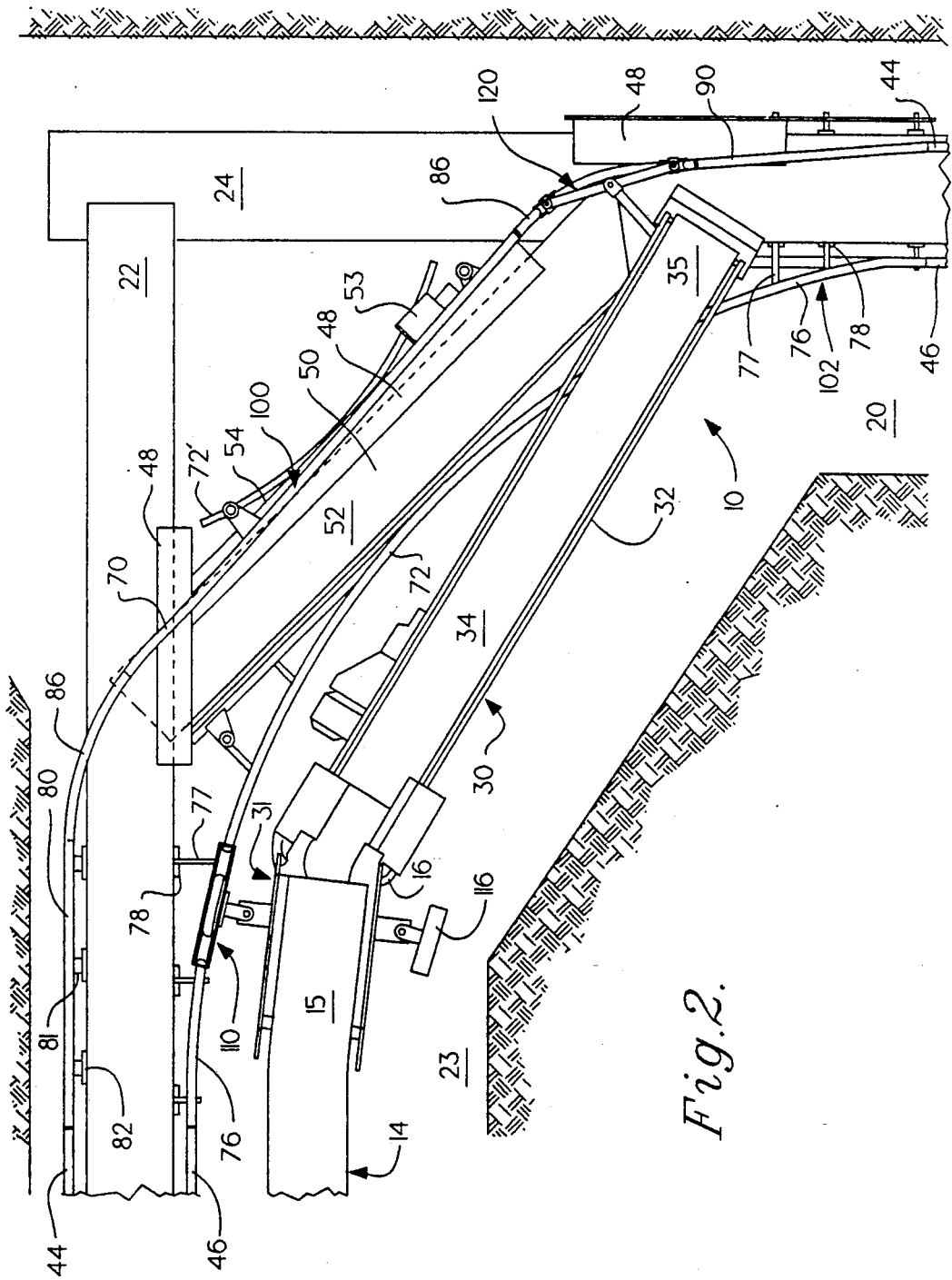
FIG. 2 is a plan view of the auxiliary conveying system of the present invention.

The instant invention is directed toward a means for providing the mining machine 12 and its attendant mobile articulated conveyor 14 with additional maneuverability to develop the clearance and roadways required to expand the network of stationary conveyors without the need of separate shuttle cars and additional mining equipment. The above-described problem is alleviated by the provision of an auxiliary conveying apparatus 10. The auxiliary conveying apparatus 10 of the present invention, as illustrated in FIG. 2, consists of a portable auxiliary conveyor 50 that is angularly disposed between the conveyors 22 and 24 at their point of intersection. As will be discussed below, the auxiliary conveyor 50 is adapted to receive the mined ore from a bridge conveyor 30 and discharge it onto the main conveyor 24.

Figure 5:
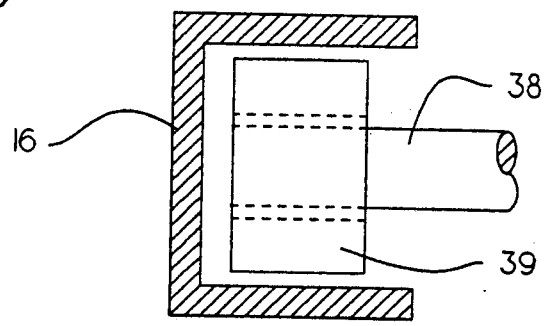
FIG. 5 is a cross-sectional view of the support track of the present invention taken along line V—V.

In order to practice the present invention, the bridge conveyor 30 and its method of attachment to the discharge end 15 of the mobile articulated conveyor 14 is preferably modified as discussed hereinbelow. In particular, with reference to FIGS. 3 and 4, a typical bridge conveyor 30 has a frame 32 adapted to orbitally support an endless belt 34 thereon. In the preferred embodiment, the frame 32 is constructed from heavy duty tubular steel and has a plurality of cross members 33 provided along its length to stabilize and prevent the frame 32 from twisting. Also in the preferred embodiment, the joint between the bridge conveyor 30 and the mobile articulated conveyor 14 is provided with additional pivotal support by rigidly attaching an arcuate shaped support track 16 to the underside of the discharge end 15 of the mobile articulated conveyor 14. The support track 16 is arranged to provide bearing and overturning support for the load end 31 of the bridge conveyor 30 as it pivots in a horizontal plane with respect to the discharge end 15. Cooperating with the support track 16 are at least two outwardly extending roller arms 38 that are rigidly attached to the underside of the frame 32 of the bridge conveyor 30 (See FIG. 4). A roller or wheel member 39 is rotatably fastened to the end of each roller arm 38 and is adapted to travel on the support track 16 as the bridge conveyor pivots about the end of the mobile articulated conveyor 14 (See FIG. 5).

It will be appreciated that the load end 31 of the bridge conveyor 30 is normally pivotally attached to the discharge end 15 of the mobile articulated conveyor 14 by a pin and socket arrangement. More specifically, the load end 31 of the bridge conveyor 30 typically has a downwardly extending pin member 37 rigidly attached thereto which is rotatably received in an upstanding socket member 17 that is operably attached to the discharge end 15 of the mobile articulated conveyor 14. In the preferred embodiment of the present invention, the upstanding socket member 17 is rigidly attached to the underside of the discharge end 15 as is the support track 16.

The auxiliary conveying apparatus 10 of the present invention includes a portable auxiliary conveyor 50 that is angularly disposed between the conveyors 22 and 24 as shown in FIG. 2. As will be discussed below, the auxiliary conveyor 50 is adapted to receive the mined ore from the bridge conveyor 30 and discharge it onto the conveyor 24.

Referring now to FIGS. 6 and 7, the auxiliary conveyor 50 consists of an endless conveyor belt 52 that is operatively supported on a frame 54 between idler rollers 56 and 58. The frame 54 preferably consists of welded structural steel, however, those skilled in the art will recognize that frame 54 may be constructed out of any suitable material adapted to operatively support conveyor belt 52 and to withstand the abuse commonly experienced in underground mining operations. The idler rollers 56 and 58 are preferably rotatably supported on the frame 54 by pillow blocks 59, however, idler rollers 56 and 58 may be attached to frame 54 by any suitable bearing means. As most specifically shown in FIG. 6, conveyor belt 52 is disposed on an angle to enable the upstream portion of the belt 52 to be positioned under conveyor 22 while enabling the downstream portion of belt 52 to extend over conveyor 24 for discharge thereupon. The belt 52 is driven in an orbit denoted by the arrow "C" on FIGS. 6 and 7 by a drive motor 53 (see FIG. 2) or any suitable drive means attached to a drive roller 55. In the preferred embodiment, an adjustable idler roller 57, of the type commonly used on belt conveyors, is provided to compensate for any slack that subsequently develops due to the wearing and stretching of the endless belt 52. It will be understood that the drive roller 55 and the idler roller 57 may be rotatably fastened to the frame 54 by any suitable bearing means (not shown).

As can be seen in FIG. 6, skid pads 60 are preferably attached to the bottom of the frame 54 to enable the auxiliary conveyor 50 to be pushed or pulled along the mine surface when being relocated. Leveling screws 62 are preferably provided on each corner of the frame 54 to enable the height of the auxiliary conveyor 50 to be adjusted after it is moved into position. The leveling screws 62 preferably consist of a screw 63 and nut 64 arrangement with a ball and socket pad 65 attached thereto. A hand crank 66 is preferably welded to the top of the screw 63 to simplify the adjustment process. However, it will be appreciated that other forms of known mechanical and hydraulic leveling devices may be used.

In the preferred embodiment, the bridge conveyor 30 is guided along the conveyors 22, 50 and 24 by a series of interconnected guide rails. More specifically, as illustrated in FIG. 2, the conveyors 22 and 24 each have an outer guide rail 44 and an inner guide rail 46, typically fabricated out of round steel tubing, attached thereto. In the preferred embodiment, the auxiliary conveyor 50 is provided with guide rails 70 and 72 that are adapted to correspond with the guide rails 44 and 46 to form continuous rails for guiding the bridge conveyor 30 along the conveyors 22, 50 and 24. In particular, an outer guide rail 70 is rigidly attached to the side of the auxiliary conveyor 50 at an elevation that is above the outer guide rails 44 located on the conveyors 22 and 24. In addition, an inner guide rail 72 is rigidly affixed to the auxiliary conveyor 50 and is adapted to substantially correspond with the inner guide rails 46 that are normally attached to conveyors 22 and 24. The inner guide rail 72 has an arcuate shape that is adapted to guide the discharge end 15 of the mobile articulated conveyor 14 in a radius that substantially corresponds with its normal turn radius. In the preferred embodiment, an identical pair of guide rails 70' and 72' are attached to the opposite sides of the auxiliary conveyor 30 to permit the auxiliary conveyor 50 to be used, for example, on the opposite side of the stationary conveyor 22. I prefer to construct the guide rails 70 and 72 out of the same type and size of tubular steel that makes up the guide rails 44 and 46 that are located on the conveyors 22 and 24. It will be understood, however, that guide rails 70 and 72 may be fabricated out of any suitable material adapted to interface with the guide rails 44 and 46 in the manner described below.

Figure 10:
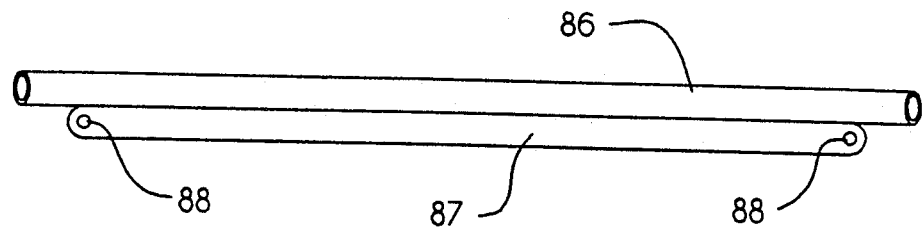
FIG. 10 is a side view of a transition guide of the present invention.

As can be seen in FIG. 2, the outer guide rail 70 is united with the outer guide rails 44 on the conveyors 22 and 24 by a collection of interconnected transition guides 86, 80 and 90. As most specifically shown in FIG. 10, transition guides 86 each have a downwardly extending rib member 87 rigidly fastened thereto to enable it to be fastened to a clevis 73 or 73' mounted to each end of the guide rails 70 or 70' (see FIGS. 6 and 7). In particular, the clevis 73 has an aperture 75 therethrough that substantially corresponds with one of the apertures 88 located in the ends of the rib member 87. A bolt or pin (not shown) is inserted through the apertures 75 and 88 to fasten the transition guide 86 to the end of the guide rail 70.

Figure 8:
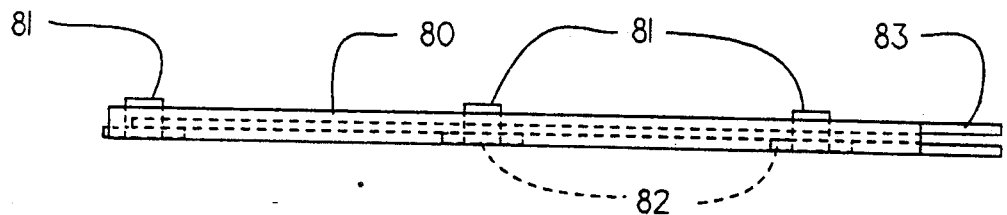
FIG. 8 is a top view of a transition guide of the present invention.
Figure 9:
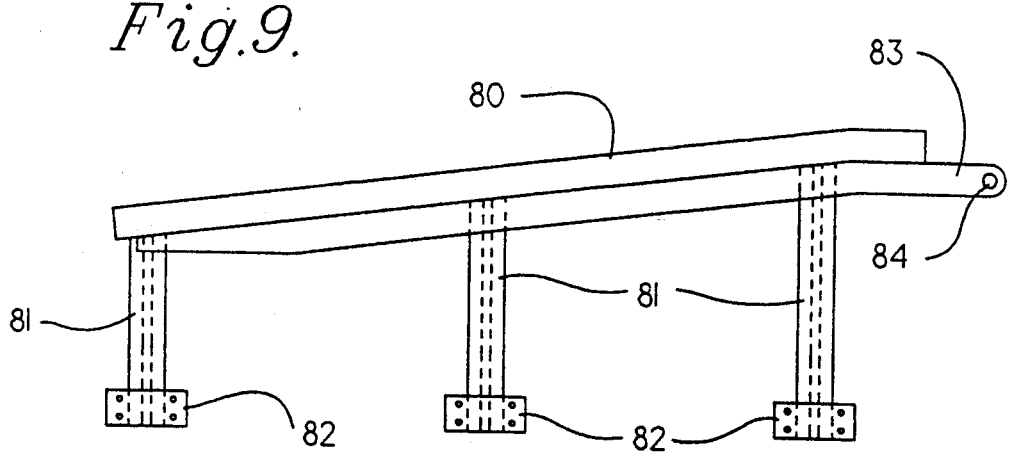
FIG. 9 is a side view of the transition guide of FIG. 8.

One of the transition guides 86 is united with the guide rail 44 mounted on the conveyor 22 by a third transition guide 80 that is removably attached to the side of the conveyor 22. As can be seen in FIGS. 8 and 9, the transition guide 80 has a plurality of graduated vertical support members 81 that are adapted to be removably fastened to the side of the conveyor 22. In the preferred embodiment, bolt pads 82 are attached to the ends of the vertical support members 81 to thereby enable the transition guide 80 to be bolted to the side of conveyor 22. The transition guides 80 and 86 are connected together by a clevis 83 that extends from the end of the transition guide 80. In particular, the clevis 83 has an aperture 84 therethrough that substantially corresponds with an aperture 88 located in rib member 87. A pin or bolt 89 is inserted through the apertures 84 and 88 to fasten the transition guides 80 and 86 together in the manner depicted in FIG. 11.

A fourth transition guide 90 is employed to connect the guide rail 70 and the second arcuate transition guide 86 to the guide rail 44 mounted to the conveyor 24 (see FIG. 2). The transition guide 90 preferably consists of a straight piece of tubular steel adapted to snugly fit between the end of transition piece 86 and the end of guide rail 40. As shown in FIGS. 12, 13 and 14, a clevis 94, having an aperture 95 therethrough, is attached to one end of the transition guide 90 to enable it to be bolted or pinned to the rib 87 of guide 86. At least two graduated vertical support members 92, having bolt pads 93 attached thereto, are rigidly connected to the transition guide 90 to enable it to be removably fastened to the conveyor 22 at a height that substantially corresponds with the guide rails 86 and 44. In the preferred embodiment, in order to decrease the amount of time required to install the present invention, the end of guide rail 90 is simply butted against the end of the guide rail 44 and is not connected thereto. It will be understood that when connected to the guide rail 70 in the manner described above, transition guides 80, 86 and 90 cooperate with the outer guide rails 44 on the conveyors 22 and 24 to form one continuous guide rail generally designated as 100.

A similar collection of transition guides are employed to connect the guide rail 72 to the guide rails 46 located on the inside of conveyors 22 and 24. More specifically, transition guides 76 are removably fastened to the sides of the conveyors 22 and 24 and are adapted to cooperate with the guide rail 72 on the auxiliary conveyor 50 to form a second continuous guide rail generally designated as 102. As can be seen in FIG. 2, the transition guides 76 are removably fastened to the conveyors 22 and 24 by a series of support members 77. In the preferred embodiment, the support members 77 have a bolt pad 78 fastened thereto to enable transition guide 41 to be bolted to the sides of conveyors 22 and 24. To decrease the amount of time and effort required to install the auxiliary conveyor 50 of the present invention, the transition guides 76 are not connected to the guides 46 and 72, but instead are adapted to fit between the guide rails 46 and 72 in a butting arrangement to form the continuous rail 102. It will be appreciated, however, that transition guides 76 may be fastened to guide rails 46 and 72 by using a similar clevis-pin arrangement as was described above.

As can be seen in FIG. 2, a two-wheeled dolly 110 movably supports the discharge end 15 of the mobile articulated conveyor 14 on the continuous guide rail 102. In the preferred embodiment, dolly 110 consists of a frame member 112 that is pivotally attached to the frame of the mobile articulated conveyor 14. As can be seen in FIG. 4, dolly 110 has a pair of wheels 114 rotatably fastened thereto that are adapted to ride upon the continuous guide rail 102. As can be seen in FIGS. 2–4, a wheel member 116, adapted to run on the mine floor, is also pivotally fastened to the support track 16 to provide additional support for the discharge end 15 of the mobile articulated conveyor 14.

The discharge end 35 of the bridge conveyor 30 is movably guided along the continuous guide rail 100 by a second dolly 120. As depicted in FIGS. 3 and 4, the dolly 120 is pivotally attached to an outwardly extending support member 121 that is rigidly attached to the discharge end of the bridge conveyor frame 32. In the preferred embodiment, the dolly 120 consists of a frame member 122 that is rotatably pinned to the support member 121 by a pin 114. As can be clearly seen in FIG. 3, each end of the frame member 122 has a wheel 126 rotatably fastened thereto that is adapted to run on the continuous guide rail 100. The wheels 126 preferably have an upstanding pin member 128 fastened thereto that is adapted to be rotatably received in corresponding upstanding socket members 129 that are provided in the ends of the frame member 122. It will be understood by those of ordinary skill in the art, however, that wheels 126 may be rotatably fastened to frame member 122 by any suitable fastening means.

To prevent spillage of the mined ore as the bridge conveyor traverses over the conveyors 22, 50 and 24, pieces of skirting 48 are preferably attached along the sides of auxiliary conveyor 50. Although skirting 48 may be provided along both sides of the auxiliary conveyor, I have found the locations depicted in FIG. 2 to be superior. It will be understood that the skirting 48 may be fashioned into a variety of configurations and may be fabricated out of sheet metal, rubber, or any other suitable material.

The auxiliary conveying system of the present invention is utilized when the mining machine 12 with its attendant mobile articulated conveyor 14 has mined as far as it can reach while remaining movably attached to the guide rails 44 and 46 of, for example, the main conveyor 24. At this point, the mobile articulated conveyor 14 is retracted along the main conveyor 24 far enough to enable a section of conveyor 22, complete with its guide rails 44 and 46 to be positioned for discharge into the conveyors 24 as illustrated in FIG. 2. The auxiliary conveyor 50 of the present invention is then arranged between the conveyors 22 and 24 so that the downstream portion of belt 52 extends over conveyor 24 while the upstream portion of belt 52 extends under conveyor 22. It will be understood that this arrangement enables the bridge conveyor 30 to discharge the ore at a point where the auxiliary conveyor 50 and panel conveyor 22 meet without incurring spillage or loss of the ore.

The transition guides 76, 80, 86, and 90 are then attached in the manner described immediately above to create the continuous guide rails 100 and 102 for supporting dollies 110 and 120. Upon installation of the present invention, the bridge conveyor 30 is free to discharge the mined material onto any of the three stationary conveyors 22, 50 and 24 in response to the movement of the mining machine 12 and the mobile articulated conveyor 14. It will be appreciated that after the mining machine 12 with its attendant mobile articulated conveyor 14 has progressed to a position wherein the mobile articulated conveyor 14 lies entirely along conveyor 24, the auxiliary conveyor 50 and its accompanying transition guides may then be removed and stored until a new branch network is created.

As such, the present invention provides the mobile articulated conveyor with additional maneuverability to develop the necessary roadways and clearance generally needed to expand the network of stationary conveyors without the need of a second mining machine. It will be understood, however, that various changes in the details, materials and arrangements of parts which have been herein described and illustrated in order to explain the nature of the invention may be made by those skilled in the art within the principle and scope of the invention as expressed in the appended claims.

What is claimed is:

1. An apparatus for receiving and conveying material from a movable first conveyor having an extended conveyor section pivotally attached thereto to second and third intersecting conveyors comprising:
   conveying means disposed between the second and third conveyors, said conveying means being adapted to receive material from the extended conveyor section of the first conveyor and discharge the material onto the third conveyor;
   first guiding means attached to the second and third conveyors and said conveying means for guiding the extended conveyor section of the first conveyor in a predetermined path above the second and third conveyors and said conveying means for discharge thereupon without spillage of the conveyed material; and
   second guiding means attached to the second and third conveyors and said conveying means for guiding the first conveyor in a predetermined path adjacent to the second and third conveyors and said conveying means.

2. The apparatus recited in claim 1, wherein said predetermined path for guiding the extended conveyor section of the first conveyor above the second and third conveyors has a curvilinear portion that extends above said conveying means.

3. The apparatus as recited in claim 2 wherein said first guiding means comprises:
   a plurality of interconnected guide rail sections removably affixed to said conveying means and said second and third conveyors; and
   means for movably attaching the extended conveyor section of the first conveyor to said guide rail sections.

4. The apparatus as recited in claim 3 wherein said second guiding means comprises:
   a plurality of interconnected guide track sections removably affixed to said conveying means and said second and third conveyors; and
   means for movably attaching the first conveyor to said guide track sections.

5. The apparatus as recited in claim 4 wherein said guide rails comprise:
   primary guide rail sections rigidly fastened to the second and third conveyors and being adapted to guide the extended conveyor section of the first conveyor above the second and third conveyors for discharge thereupon;
   a secondary guide rail section rigidly attached to said conveying means and substantially corresponding with said primary guide rail sections on said second and third conveyors; and
   a plurality of transition sections removably fastened to said second and third conveyors, said transition sections being adapted to connect said primary guide rail sections to said secondary guide rail section to create a first continuous guide rail adapted to guide the extended conveyor section of the first conveyor in said predetermined path above said second and third conveyors and said conveying means.

6. The apparatus as recited in claim 5 wherein said guide tracks comprise:
   primary guide track sections rigidly fastened to the second and third conveyors and being adapted to guide the first conveyor in said predetermined path adjacent to said second and third conveyors;
   a secondary guide track section rigidly attached to said conveying means and substantially corresponding with said primary guide track sections on said second and third conveyors; and
   a plurality of transition track sections removably fastened to said second and third conveyors, said transition track sections being adapted to connect said primary guide track sections to said secondary guide track section to create a first continuous guide track adapted to guide the first conveyor in said predetermined path adjacent to said second and third conveyors and said conveying means.

7. The apparatus as recited in claim 6 wherein said means for movably connecting the extended conveyor section of the first conveyor to said first continuous guide rail comprises a guide member attached to the discharge end of the extended conveyor section of the first conveyor, said guide member being adapted to move upon said first continuous guide rail.

8. The apparatus as recited in claim 7 wherein said means for movably connecting the first conveyor to said first continuous guide track comprises a support member pivotally attached to said first conveyor, said support member being adapted to move upon said first continuous guide track.

9. The apparatus as recited in claim 8 wherein said guide member has at least one wheel pivotally attached thereto, said at least one wheel being adapted to ride on said first continuous guide rail.

10. The apparatus as recited in claim 9 wherein said support member has a plurality of wheels pivotally attached thereto, said wheels being adapted to ride on said first guide track.

11. The apparatus as recited in claim 10, wherein said conveying means comprises a frame having a driven endless belt operably attached thereto, said frame being disposed between the first and second conveyors so that a first portion of said endless belt extends under a portion of the first conveyor and a second portion of said endless belt extends over the second conveyor to thereby enable said endless belt to receive material from the first conveyor and discharge the material onto the second conveyor.

12. The apparatus as recited in claim 11 additionally comprising skirting removably attached to said frame to prevent spillage of the conveyed material as the discharge end of the first conveyor is guided in said predetermined path above the second and third conveyors and said endless belt on said frame.

* * * * *